United States Patent
Anderson et al.

(10) Patent No.: US 11,825,944 B2
(45) Date of Patent: Nov. 28, 2023

(54) CONE ASSEMBLY AND METHOD OF MANUFACTURING SUCH ASSEMBLY

(71) Applicant: PALSKOG TEKNIK AB, Vikingstad (SE)

(72) Inventors: Lars Anderson, Ljungsbro (SE); Rickard Martensson, Ydre (SE); Marcus Bergelin, Lerberget (SE)

(73) Assignee: PALSKOG TEKNIK AB, Vikingstad (SE)

( * ) Notice: Subject to any disclaimer, the term of this patent is extended or adjusted under 35 U.S.C. 154(b) by 20 days.

(21) Appl. No.: 16/965,724

(22) PCT Filed: Jan. 30, 2019

(86) PCT No.: PCT/SE2019/050074
§ 371 (c)(1),
(2) Date: Jul. 29, 2020

(87) PCT Pub. No.: WO2019/151933
PCT Pub. Date: Aug. 8, 2019

(65) Prior Publication Data
US 2021/0030151 A1    Feb. 4, 2021

(30) Foreign Application Priority Data
Jan. 30, 2018 (SE) .................... 1850099-1

(51) Int. Cl.
*A47B 91/00* (2006.01)
*B32B 21/14* (2006.01)
(Continued)

(52) U.S. Cl.
CPC ............ *A47B 91/005* (2013.01); *B32B 21/14* (2013.01); *B32B 7/12* (2013.01); *B32B 21/02* (2013.01);
(Continued)

(58) Field of Classification Search
CPC ........ A47B 91/005; B27D 1/08; B27D 1/083; B27D 1/086; B27D 1/10; B29C 66/1122;
(Continued)

(56) References Cited

U.S. PATENT DOCUMENTS 1,855,041 A    4/1932  Bodony
2,540,482 A    2/1951  Hervey
(Continued)

FOREIGN PATENT DOCUMENTS

DE    102013208166 A1    11/2014
EP    0868983 A1    10/1998
(Continued)

OTHER PUBLICATIONS

International Search Report dated Mar. 28, 2019; International Application No. PCT/SE2019/050074.

*Primary Examiner* — Catherine A. Simone
(74) *Attorney, Agent, or Firm* — DINSMORE & SHOHL LLP

(57) ABSTRACT

A cone assembly for furniture or interior accessories is provided. A plurality of cones is arranged in a linear array to form the cone assembly, wherein an inner cone is received by at least one outer cone; and wherein the outer cone is made of a first layer of material being different from the material of the inner cone.

20 Claims, 11 Drawing Sheets

(51) Int. Cl.
*B32B 21/02* (2006.01)
*B32B 21/06* (2006.01)
*B32B 21/08* (2006.01)
*B32B 7/12* (2006.01)

(52) U.S. Cl.
CPC ............... *B32B 21/06* (2013.01); *B32B 21/08* (2013.01); *B32B 2260/028* (2013.01); *B32B 2260/046* (2013.01); *B32B 2317/16* (2013.01); *B32B 2479/00* (2013.01)

(58) Field of Classification Search
CPC ...... B29C 66/52271; B29C 66/51; F16L 9/01; E04H 12/04; B27M 3/006; B27M 3/32; E04C 3/36; E04C 3/127; E04C 3/122; E04C 3/12; B32B 21/02; B32B 21/06; B32B 21/08; B32B 21/14; B32B 2260/028; B32B 2260/046; B32B 2479/00
See application file for complete search history.

(56) References Cited

U.S. PATENT DOCUMENTS

| | | | |
|---|---|---|---|
| 3,956,242 A | 5/1976 | Olander | |
| 5,438,812 A | 8/1995 | Erickson | |
| 5,576,082 A * | 11/1996 | Jarrett | ................... B27D 1/086 |
| | | | 138/155 |
| 5,746,863 A | 5/1998 | Jarrett | |
| 2003/0167720 A1 | 9/2003 | Gottlieb | |

FOREIGN PATENT DOCUMENTS

| | | | |
|---|---|---|---|
| GB | 119337 A | * | 10/1918 |
| SE | 1551143 A1 | * | 10/2016 |
| WO | 2017044033 A1 | | 3/2017 |
| WO | 2017123143 A1 | | 7/2017 |

* cited by examiner

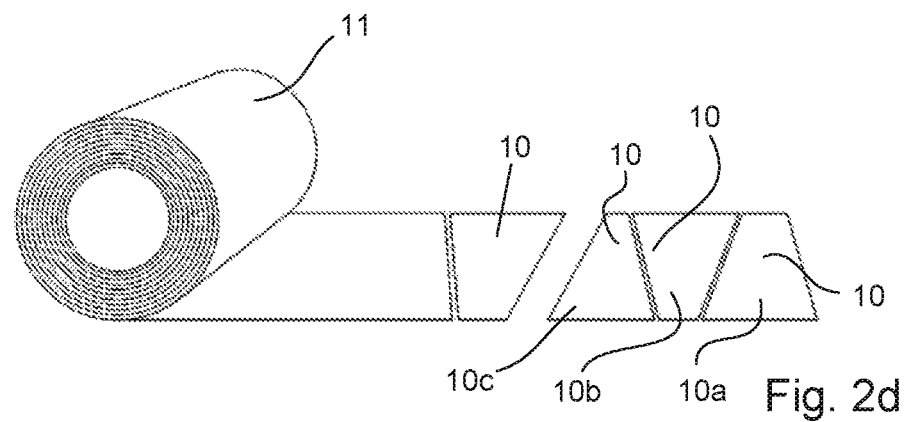
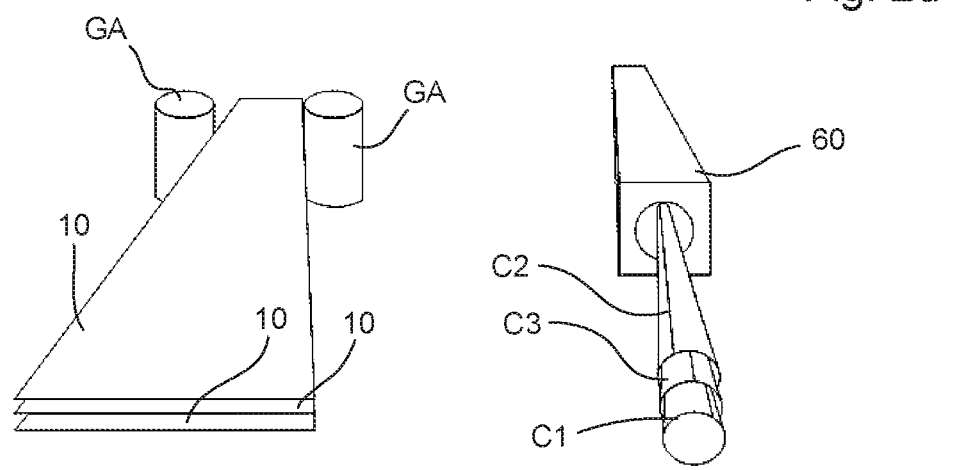
Fig. 2e
Fig. 2g
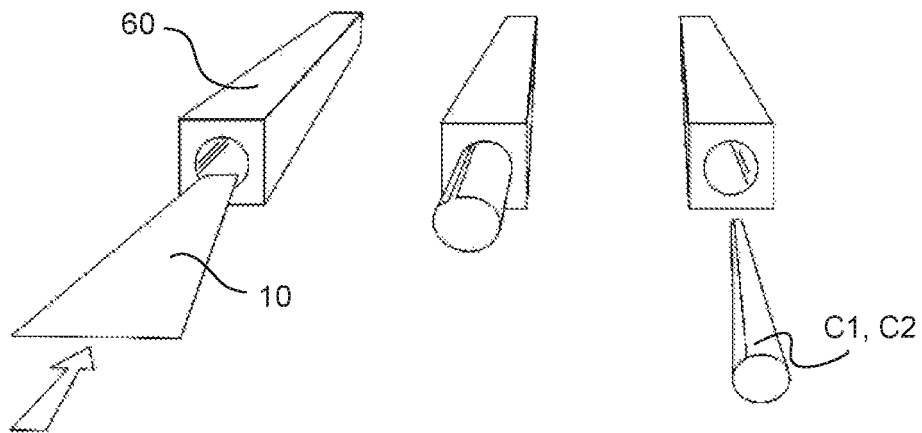
Fig. 2f

CONE ASSEMBLY AND METHOD OF MANUFACTURING SUCH ASSEMBLY

CROSS-REFERENCE TO RELATED APPLICATIONS

This application is the U.S. national stage of PCT/SE2019/050074 filed Jan. 30, 2019, which claims priority to Sweden Application No. 1850099-1, filed Jan. 30, 2018, the entire content of both are incorporated herein by reference in their entirety.

FIELD OF THE INVENTION

The present invention relates to a cone assembly, e.g. used to form a cone-shaped furniture leg or other longitudinal components, and a method for manufacturing such cone assembly.

BACKGROUND OF THE INVENTION

Longitudinal components are used for various types of applications; indoor applications typically include furniture parts or other constructional elements such as interior accessories.

One particular application within the furniture industry is to provide a longitudinal component as a furniture leg. Furniture legs are normally made from a variety of different materials and in many different shapes. Beyond the structural function that furniture legs have, there is also an aesthetic component, where most manufacturers of furniture tend to prefer legs that are made in a specific, aesthetically pleasing material and shape. Price is also a factor for most manufacturers, preferring furniture legs that are cheap to produce. For shipping and handling purposes, it is also important for furniture legs to be light weight. These factors are of course also important for customers buying furniture. For some manufacturers, the speed of manufacturing the legs is also important, in order to be able to produce a large quantity of furniture items quickly. Most people also prefer if the manufacturing and handling process is non-toxic and environmentally friendly.

Two very popular options in materials for furniture legs are solid wood and medium density fibreboard (MDF); solid wood is typically selected for the sturdiness and classic aesthetic while MDF may be chosen due to the low price and high speed of manufacturing.

It would be desirable to provide an alternative to the options listed above that has the sturdiness and aesthetic of solid wood as well as the low price and high speed of manufacturing of MDF, not only for furniture legs but also for other applications and products. It would be further beneficial if the alternative would also be light weight and non-toxic and environmentally friendly to produce.

One example of a technique used to form longitudinal components is described in U.S. Pat. No. 5,438,812. The pole is made of a plurality of wood strips glued edge to edge thereby forming a hollow interior core, and exterior veneer sheets glued onto the wood strips. The resulting pole is quite difficult to manufacture, as it requires multiple production steps in order to form the inner core, as well as the outer cover. In addition, the outer surface will have a number of radial steps, i.e. height level steps arranged at various longitudinal positions at the outer envelope surface, making it highly unsuitable for interior design applications.

Hence, an improved assembly is desired which is suitable for interior applications, such as furniture components.

SUMMARY OF THE INVENTION

Accordingly, the present invention seeks to combine beneficial features of prior art without some of the prior art's shortcomings while also adding new beneficial features. One aspect of the invention is a cone assembly for use as a furniture component, e.g. a furniture leg, or other component for interior accessories. The cone assembly comprises a plurality of separate cones arranged in a linear array to form the cone-shaped assembly (such as a furniture leg), wherein an inner cone is received by an outer cone, preferably an outermost cone. The outermost cone may preferably be formed from a veneer by attaching the longitudinal edges of the veneer to each other. At least one of the cones may be provided with a backing material.

Different embodiments of cone assemblies will be described herein, as well as different embodiments of methods for producing cone assemblies.

The cone assembly is formed by a plurality of separate cones being arranged in a linear array; one inner cone being received into the hollow interior of an intermediate, or outer cone.

At least the outer cone, and any intermediate cone, is formed by a sheet material being folded and formed into a tapered shape (i.e. cone) by bringing the longitudinal ends of the sheet material together. The inner cone may be formed in a similar manner, or the inner cone may in some embodiments be formed as a solid body, as it does not require to receive any further cone. A solid body should be interpreted to include solid material, such as a piece of hard or softwood, as well as an assembled unit, for example glulam wood.

The cones are arranged in the linear array, and attached to each other by means of an adhesive (or similar). The connection between two adjacent cones is established between the inner surface of one cone, and the outer surface of the immediately inner cone.

The adhesive, to join cones with each other, can be applied to the inner surface, the outer surface, or the inner and outer surface of two cones to be connected to each other. Optionally, the adhesive is provided as an impregnated film arranged in between the two adjacent cones, or one intermediate cone may be formed from an adhesive material, such as a thermo plastic film or a thermo set resin impregnated paper.

The process of connecting separate cones to a cone assembly will also, in preferred embodiments, define the final shape of the cone assembly.

Each cone is preferably produced having a circular cross-section along its entire length. However, the final cone assembly may have other cross-sectional shapes. This is possible by using a mold when producing the cone assembly. As every cone is inserted into the mold (either in contact with the mold or in contact with an intermediate cone), the cones will be allowed to deform and adapt to the shape of the mold. The mold can be a male mold to be used with a mating female anvil, or a female mold to be used with a mating male tool. The molds can e.g. have rectangular cross-section, or a circular cross-section continuously transforming to a rectangular cross-section along the length. Various options are possible.

Each cone is preferably formed by sealing, or joining, the longitudinal ends of a sheet material.

At least the outer cone has its longitudinal ends glued together, which provides a tight joint. This is particularly advantageous for non-circular cross-sections, e.g. elliptical, triangular or polygonal, as well as for cone assemblies comprising envelope surfaces being only slightly convex or entirely planar and cross sectional shapes altering along the longitudinal axis of the assembly, e.g. elliptical at the wider end and circular at the thinner end.

The inner, or intermediate cones, may also have their longitudinal ends glued together. This will reduce the risk for sheet separation at the joint.

The glue used to join the longitudinal ends can be provided in various ways. One option is to apply glue to the ends, and join the ends of the sheet when forming the cone. Another option is to make use of the glue applied to join the cones to each other, i.e. allowing the glue on the inner and/or outer surface of the cones to flow into the joint area of the longitudinal ends. A yet further option is to make use of a surface coating for the outer/exterior surface, and allowing this adhesive coating to flow into the area of the joint.

The glue is preferably coloured to match the colour of the outer cone, and hence also the colour of the cone assembly.

For all gluing options mentioned above, the resulting joint will be homogenous along the longitudinal axis, and flush with the circumferential envelope surface of the cone. The joint formed by the adhesive/glue will consequently not form any topographical change to the cone assembly.

In a preferred embodiment, it is desired to reduce material waste and to ensure a uniform thickness of the material of the cone assembly. The sheets used to form the individual cones can therefore be adapted to specific dimensions whereby the sheet used to form the outer cone will differ slightly from the sheets used to form the intermediate and/or inner cones. Especially, each sheet has a certain thickness. This means that each cone, formed from a sheet, will have an inner diameter being slightly less than its outer diameter. The outer cone, having a certain inner diameter, will receive an intermediate or inner cone having a certain outer diameter. In order for the intermediate/inner cone to fit well within the outer cone, without protruding outside the outer cone, the sheet used to form the intermediate/inner cone must be slightly smaller than the sheet used to form the outer cone. Consequently, if the cone assembly is formed by four separate cones, the sheets used to form the cones will differ in size. The sheet used to form the outer cone will be biggest, while the sheet used to form the inner cone will be smallest. The sheets used to form the intermediate cones will be in between the size of the inner and outer sheets, respectively. The longitudinal dimension, i.e. the length of each cone, may be identical for all cones of a cone assembly, while the circumferential dimension gradually becomes smaller for each intermediate and/or inner cone.

The cone assembly may be cut at its ends in order to remove any material of uneven thickness, if there should be any protruding cones from the step of assembling the cone assembly.

The cone assembly can in some embodiments be reinforced. Such reinforcement is preferably provided in the interior of the cone assembly, by arranging one or more plugs inside the cone assembly. The plugs may be arranged at one or both ends, or somewhere in between the ends. The plugs may be hollow or provided with a through hole, in order to allow for cables or other external equipment to run through the plugs.

Reinforcement may also be provided as short cones, shorter than the cones of the main cone assembly body, arranged on the interior of the inner cone or on the exterior of the outer cone of the cone assembly. The short cone may e.g. be arranged at the upper and wider end of the cone assembly, at an intermediate position between the ends, or at the bottom end, to provide for a local strengthening of the cone assembly.

At least the outer cone is preferably made from a sheet of wooden veneer, which provides for a wooden appearance of the entire cone assembly. In cases when wooden veneers are used, it is preferred to provide the wooden veneer with a backing material, such as paper or a non-woven material. Wooden veneers used to form cones are preferably tenderized, and also softened by exposing the wooden veneer to heat treatment immediately before shaping into cones is performed.

In an embodiment, the cone assembly comprises at least two cones of which a first cone is linearly inserted in a second cone, where the inner envelope surface of said first cone is connected to an outer envelope surface of said second cone. The inner circumferential dimension of an end of the first cone is essentially the same as an outer circumferential dimension of the second cone, at an end essentially positioned at the same linear (or longitudinal) position as the first cone. The sheet of the inner cone is cut smaller in size compared to the sheet of the outer cone.

The outermost joint (i.e. the longitudinal joint formed by two longitudinal ends of a sheet, or veneer edges, coming into contact with each other) may be fixed, i.e. the longitudinal edges of the sheet or veneer may be attached to each other. Preferably, the joint is flush with the circumferential exterior surface of the cone.

The advantage of this aspect is that the plurality of cones gives the cone assembly strength, while the cones themselves are easy and cheap to manufacture. The linear array is easy and cheap to manufacture as well since the cones can be made to help them fit well to each other. The backing material will provide strength and allow for more advanced shaping of the cone assembly. The cones may be made from flexible materials, allowing furniture manufacturers a certain freedom to change the lateral shape of the cone assembly before they are fastened to an associated furniture piece without sacrificing the strength of the cone array.

It should be realized that the term "cone" is to be interpreted as a three-dimensional object with a cross-section taken along its longitudinal direction, of one or more two-dimensional shapes where the width of the cross-section at one end of the cone is larger than the width of the cross-section at the other end of the cone. Several separate cones are used to form a cone assembly, i.e. the cone assembly exhibits a tapered profile. A cone may according to this invention be solid or hollow; the outer and any intermediate cones will be hollow, while an innermost cone may be solid or hollow. In case of a hollow cone, the inner width of the larger end of the cone is larger than the outer width of the smaller end to facilitate insertion. The cones can be pointed or truncated, have a linear width increase or a non-linear width increase, the cross-section can have many different shapes along the length of the cone, in particular non-circular shape such as polygon shapes with rounded corners or elliptic shape, and it is not necessary for the cones to have the same shape.

Preferably, the inner cone is provided such that it has a uniform thickness at each specific longitudinal position. At each cross-section, the thickness of the inner cone is the same along its circumferential extension.

In an embodiment, the cone assembly has a bottom end and an upper end, whereby the terms "upper" and "bottom" refer to the position during the intended use. At any given longitudinal position of the cone assembly, the radius is the same or less than a radius above that particular longitudinal position. In an alternative embodiment, the increase in radius is spirally formed such that the cone assembly can be screwed out from a mold, whereby it is possible to have the same, or even larger diameter at a given torsion angle, at the lower longitudinal position relative a diameter straight above.

Preferably, the sheet material used to form a single cone may have longitudinal edges cut at an angle, such that splicing of the edges is possible in a manner ensuring constant, or close to constant, thickness of the sheet material across the longitudinal joint. Both edges may be cut at an angle inwardly from the outer face of the veneer to the inner surface of the veneer. This will ensure that the outer cones contact at the outer surface which may be particularly important on thicker veneers, such as veneers having a thickness of above 1 mm, and even more above 2 mm.

The dimensions of the cones used to form the cone assembly are configured to improve the final product. In particular, the inner radius of the outer cone may be matched to the outer radius of one or more of the inner cones, such that a good fit of the inner cones within the outer cone is possible.

If there is a situation where one end portion of a cone is protruding outside another cone, it may be desired to reduce the length of such end portion to ensure that the major part of the cone assembly has a uniform thickness.

Such length of the end portion may e.g. not exceed 20 times the thickness, preferably not more than 10 times, of the sheet used to form one or more of the cones. The thickness of the sheet may include backing material, as well as any adhesive used to attach the backing material to the sheet.

All of the cones made of a wooden material may be provided with a backing material. This has the advantage of increasing the sturdiness of the leg, but also allowing more advanced shaping of each cone into the desired shape of the final cone assembly.

The backing material may be a paper-based material. This is easy and cheap to manufacture.

At least one cone may be made from a sheet material. The sheet material may e.g. be a veneer, i.e. a thin deformable sheet of material. In a preferred embodiment, at least one cone is made of a wooden veneer. At least one cone may be made from a veneer formed by any one or more of the following materials: paper, plastic, hemp, cellulose, wood, cork, non-woven material, thermo setting resin impregnated paper, or medium density fibreboard (MDF). Even metal may be considered, such as steel or aluminium. This makes the manufacturing process more flexible, as these materials in some cases may be easier to produce than wooden veneer and they can have properties that may be desirable depending on specific uses for the leg.

In a preferred embodiment at least one cone, such as the outer cone, is made from a wood veneer, even more preferably by a wood veneer having a fiber orientation along the longitudinal axis of the cone.

At least the outer cone may be formed from a wooden veneer by attaching the longitudinal edges of the wooden veneer to each other. This has the advantage of giving the cone assembly a "wooden" appearance, without using solid wood.

The outward facing surface of at least the outermost cone may be provided with a coating. The coating may be applied before or after the process of connecting individual cones in an array. The coating may harden during a fixation process, e.g. due to heat and/or pressure. The coating may be a sheet layer, forming the outermost cone. As an alternative, the sheet coating layer may be attached to a veneer before it is formed to a cone. The sheet coating layer may e.g. be an overlay paper used in laminate flooring, such as a pure cellulose fiber sheet impregnated with melamin formaldehyde resin and provided with aluminum oxide particles, e.g. having a weight of 18-50 g/m2. This will make the surface very durable. This is also advantageous because the coating may provide the cone assembly with properties that it otherwise might not have, such as water resistance, gloss, etc.

The cones may be attached to each other using an adhesive. This increases the sturdiness of the cone assembly and reduces the risk of the individual cones separating. The adhesive may be applied to the sheet material prior to forming the cone; this is advantageous in that the adhesive may be dry prior to cone forming, but activated by heat and/or pressure when the cone array is manufactured.

Such adhesive, or glue, may be a thermo setting resin, such as melanin formaldehyde, phenolic, urea formaldehyde and combinations thereof. It may penetrate partially or completely into the veneer. It may be colored. It may be added by a resin impregnated sheet. The sheet may be saturated or over saturated. This may be an aspect when connecting a linear continuous array of cones forming an elongated pole, especially for an outdoor pole supporting cables or similar. It is then preferably used at the lower section of the pole, which may be subjected to ground contact. By using such adhesive the pole will be extra resistant to water, wear, and decay, making it suitable for exterior use, such as a support pole for instance for cables, balconies, lights, and flags.

According to an aspect of the invention, an elongated pole is provided. The pole may be manufactured using one or more resin impregnated sheets, unsaturated, saturated or over-saturated, as described above. The pole, which preferably is constructed for outdoor use and for supporting cables, lights, etc., comprises a plurality of cones being arranged in a linear continuous array such that each cone protrudes out from an adjacent cone, and such that the linear continuous array forms a hollow cylinder. For this particular aspect, one or more cones may be produced in accordance with the specification herein. When producing the linear continuous array of cones, resin (or any other adhesive) may be applied to the inner surface of a cone to receive another cone, the outer surface of a cone to be received in another cone, or to the inner as well as the outer surface of a cone. A pole may therefore be manufactured by providing a plurality of veneers of the same dimensions, and forming a separate cone from each veneer. For example, the veneers may be of plastic material, or by wooden material. In case of using wooden veneers, these may be provided with a backing material.

Another aspect of the invention is a method of manufacturing a cone assembly. In a most preferred embodiment, the method is performed as a two step operation. As a first step, individual cones are produced by folding a sheet of material so that its longitudinal ends meet, and gluing along these ends to form a longitudinal seam. The folded sheet is kept folded until the glue has hardened. This can be performed e.g. by clamping the longitudinal ends and forcing them against each other or by inserting the sheet material into a preferably circular conical mold, where the glue at the longitudinal ends harden. After producing a plurality of separate cones, in a second step, preferably 3-5 cones are arranged onto a male tool and then pressed by a female mold to the desired shape of the cone assembly. As an alternative, the separate cones may be inserted into a female mold and a male tool is inserted into the inner cone in order to shape the cone assembly.

For both options a cone may be sprayed with a glue when it is rotated on the male mold, one by one before arranging the next cone on top of the previous cone. The glue can also be applied to the cones in a separate operation, even on the flat veneer prior to forming the cone.

According to another aspect, the cone assembly is produced in a one-step operation. The sheet material may in such embodiment be inserted directly into a female mold and then pressed to its cone-shape. This method is most suitable where the requirements on the longitudinal joint is less, for example on cone assemblies being slit open longitudinally.

In a yet further embodiment, a combination of the above aspects is provided. The outer cone is glued along the longitudinal seam, or joint, in a first operation. The other cones are then placed into the hollow interior of the outer cone. This may be the case where the outer cone is made from a veneer and the inner cone is of solid material and will serve as a male mold. This may also be suitable as a means of reducing number of operations in a multi sheet product, i.e. less cones to be pre formed.

When forming more advanced shapes, such as elliptic shapes, polygonal shape such as triangular, quadratic, pentagonal and so on and especially shapes with little convexity or even flat envelope surface, then this is preferably done with any of the above aspects/embodiments, most preferably with an outermost cone having a glued longitudinal edge.

For example at least one cone may be formed by a sheet being made from veneer. Of the cone array, at least one cone is preferably formed by a sheet being provided with a backing material. This is preferred for cones made of wooden veneer. Further steps can include forming the sheets into separate cones and inserting one or more cones into the outermost, thereby forming a cone assembly by means of a linear array of cones.

During production of a cone, the sheet is inserted in a female mold using a longitudinally distributed pressure (e.g. provided by using a male mold), such that the longitudinal edges of the sheet meet. The joint, i.e. the area where the longitudinal edges of the sheet meet, may be heated as well as provided with an adhesive, such as a thermo set glue.

The advantage of this aspect is that the cones themselves are simple and cheap to manufacture. The sheets are easy to transport and cut into appropriate shapes and rolling them into cones one at a time allows for further flexibility in the manufacturing. One cone manufacturing system can make cones of different materials and the cone assembly manufacturing system can freely choose the amount and material of the cones that suits the desired product. The cone assembly is easy and cheap to manufacture as well since the separate cones can be made to assist them to fit well to each other. The backing material will provide strength and flexibility and the outermost cone will, if made of wood veneer, provide a beautiful wooden aesthetic. The sheets may be made from flexible materials, allowing furniture manufacturers a certain freedom to change the lateral shape of the cone before they are inserted into each other without sacrificing the strength of the cone array.

The method may further comprise attaching the cones to each other by applying an adhesive to the outer surface of a cone prior to inserting the cone into an outer cone. Optionally, as mentioned above, the adhesive is already applied to one surface of the sheet prior to cone forming.

According to an embodiment, the step of manufacturing sheets for forming into separate cones comprises providing each sheet with a backing material.

According to an embodiment, the method further comprises a step of performing heat treatment and/or tenderizing of the at least one sheet made from veneer before the at least one sheet is formed into a separate cone. In particular, the veneer may be subject to softening by heating the sheet of material, and/or by tenderizing the veneer before folding it to a cone. Within this context, the term "tenderizing" should be interpreted to mean sharply bending the veneer along the fiber direction in order to make to flex more evenly.

According to an embodiment, the step of forming the sheets into separate cones is performed by arranging the sheets in a mold. The mold may typically be a female mold capable of receiving the sheet while folding it to the desired cone shape; as the sheet will strive to flex radially outwards it will conform to the inner shape of the female mold. However, in some embodiments it is also desired to use a male tool which is inserted into the female mold, such that the sheet is pressed between the male tool and the female mold. This may be particularly advantageous when the cone has a small diameter, such as in the range of 0.5-2 cm.

According to an embodiment, the step of arranging the sheets in the mold is performed such each cone is provided with a circular cross-section along the entire length of the cone.

According to an embodiment, the method further comprises a step of pressing the linear array of cones to a desired shape. This pressing step may be performed using a male tool.

According to an aspect, a furniture leg is provided. The furniture leg comprises a plurality of cones arranged in a linear array to form the leg, wherein the inner cone is received by at least one outer cone; and wherein at least one of the cones is provided with a backing material.

At least the outermost cone may be formed from a veneer by attaching the longitudinal edges of the veneer to each other.

All of the cones may be provided with a backing material.

The backing material may be a paper-based material.

At least one cone may be made from any one or more of the following materials: veneer, paper, plastic, hemp, cellulose, laminate, metal, or medium density fibreboard (MDF).

Each cone may be formed from a veneer by attaching the longitudinal edges of the veneer to each other.

The outward facing surface of at least the outermost cone may be provided with a coating.

The cones may be attached to each other using an adhesive.

According to an aspect, a method of manufacturing a furniture leg is provided. The method comprises the steps of providing sheets for forming into separate cones, where at least one cone is made from a sheet being provided with a backing material; forming the sheets into separate cones; and inserting one or more cones into each other, thereby forming a furniture leg in the form of a linear array of cones.

The method may further comprise attaching the cones to each other by applying an adhesive to the outer surface of a cone prior to inserting the cone into an outer cone.

The step of providing sheets for forming into separate cones may comprise providing each sheet with a backing material.

At least one cone may be made from any of the following materials, alone or in combination: veneer, paper, plastic, hemp, cellulose, laminate, metal, or medium density fibreboard (MDF).

The method may further comprise a step of performing heat treatment and flexing of at least one sheet made from veneer before the at least one sheet is formed into a separate cone.

The step of forming the sheets into separate cones may be performed by arranging the sheets in a mold.

The step of arranging the sheets in the mold may be performed such that each cone is provided with a circular cross-section along the entire length of the cone.

The method may further comprise a step of pressing the linear array of cones to a desired shape.

BRIEF DESCRIPTION OF THE DRAWINGS

These and other aspects, features and advantages of which the invention is capable of will be apparent and elucidated from the following description of embodiments of the present invention with reference to the accompanying drawings, wherein:

FIGS. 2d-g show a manufacturing process for producing a cone assembly.

DETAILED DESCRIPTION OF THE INVENTION

Figure 1A:
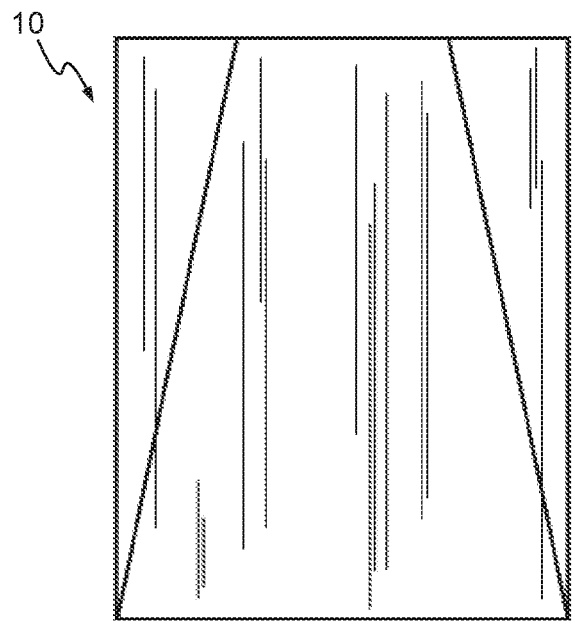
FIG. 1a shows a rectangular sheet to be formed into a cone.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 1B:
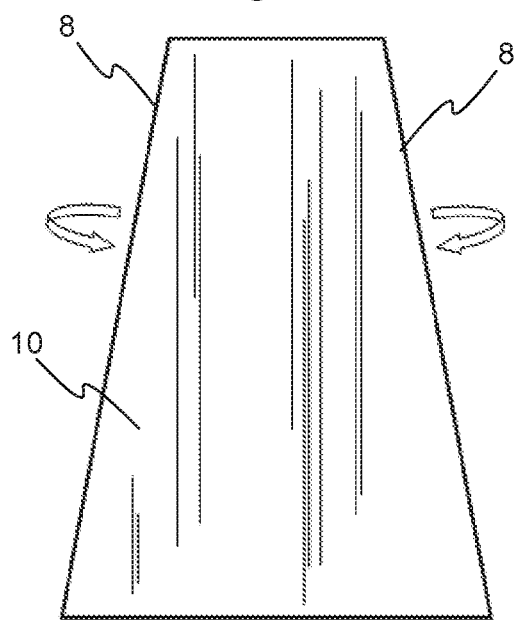
FIG. 1b shows a cut sheet to be formed into a cone.
Figure 1C:
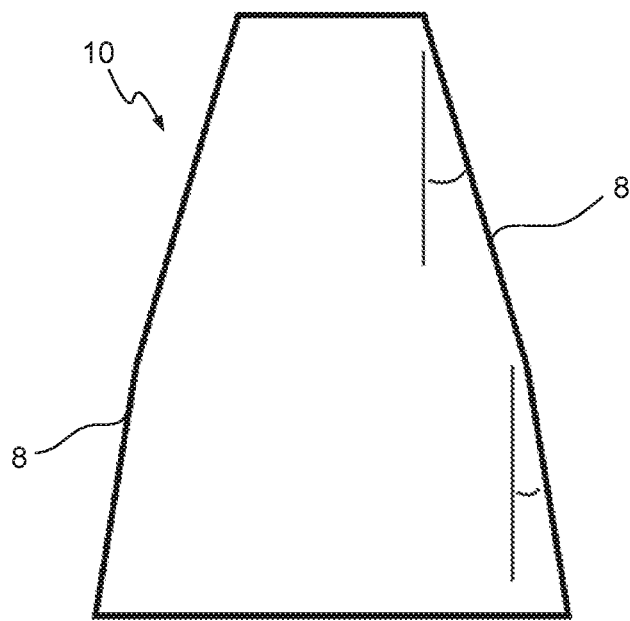
FIG. 1c shows a cut sheet to be formed into a cone, as well as a resulting cone formed from said sheet.
Figure 1C:
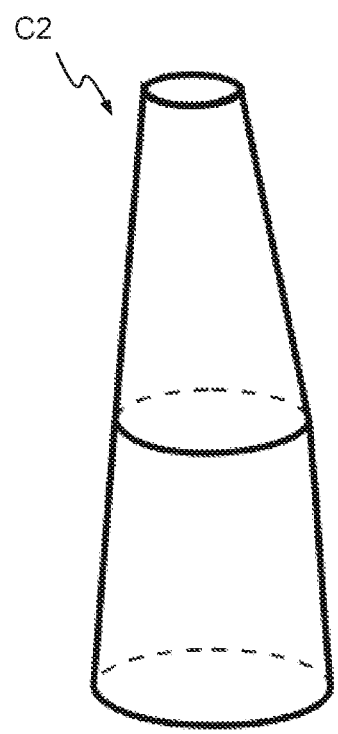
Figure 2A:
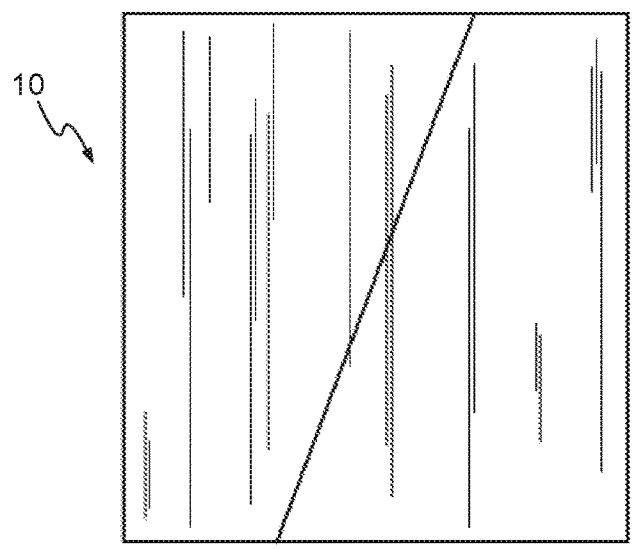
FIGS. 2a-c show a square sheet cut to be formed into a cone.
Figure 2B:
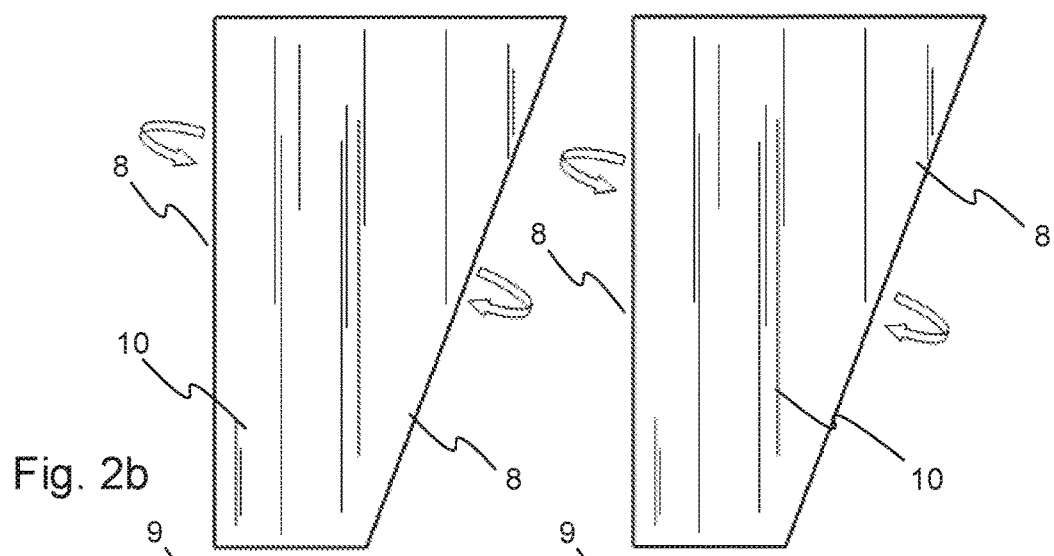
Figure 2C:
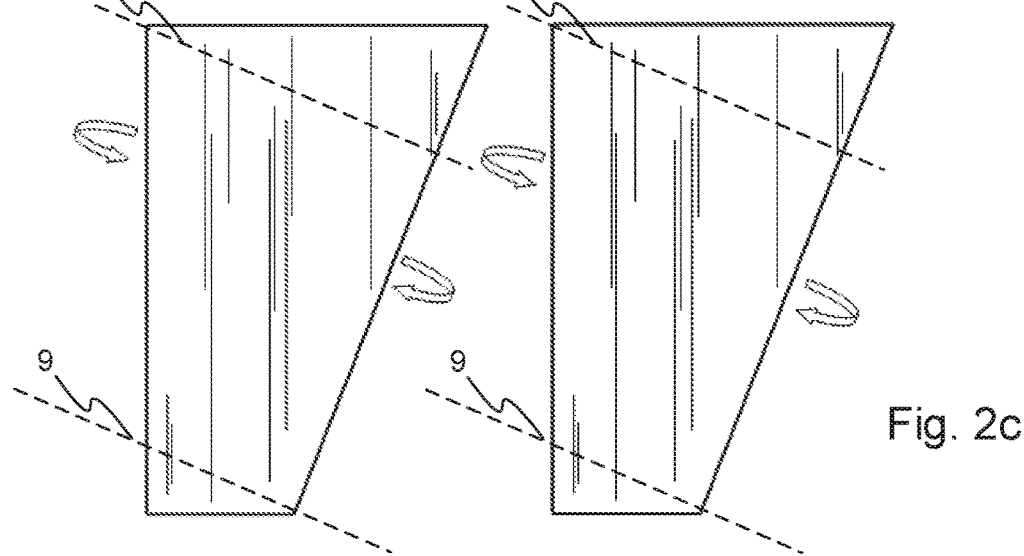

FIGS. 1a, 1b, and 1c, as well as FIGS. 2a-c illustrate sheets 10 that are optionally cut to form a tapered shape suitable for rolling into cones. The sheets 10 can be arranged in a flat configuration, thereby forming a sheet material. The sheet material may e.g. be a veneer, i.e. a thin deformable sheet of material. For fiber based materials, such as wood etc., the fiber direction may be aligned with the longitudinal direction of the cone to be formed. The fiber direction may not be perfectly aligned with the longitudinal direction of the cone, but it may differ to some extent, such as ±45° or less. Moreover, the fiber direction is not meant to refer to the direction of all fibers, but instead should be interpreted as a general direction, or mean direction, of the fibers.

In a preferred embodiment, at least one cone is made of a wooden veneer. At least one cone may be made from a veneer formed by any one or more of the following materials: paper, plastic, hemp, cellulose, wood, cork, non-woven material, thermo setting resin impregnated paper, or medium density fibreboard (MDF). Even metal may be considered, such as steel or aluminium. The sheet may be manipulated into a three-dimensional shape for example by wrapping or rolling/folding without damaging the material.

FIG. 1a shows a rectangular sheet 10; FIG. 1b shows the corresponding cut sheet as well as the direction of rolling in order to obtain a truncated cone from the cut sheet. The corner pieces cut off from the sheet 10 are discarded in this embodiment. The longitudinal edges 8 of the cut sheet 10 are folded towards each other, and optionally attached to each other in order to maintain the cone shape.

In FIG. 1c another sheet 10 is shown, being cut in a manner to create two different angles of the longitudinal ends of the sheet. At the upper end of the cone to be formed the angle is less than at the bottom end. When formed into a cone, the width of the cone will decrease in a non-linear manner as the sudden change of the cutting angle will result in an abrupt change of how the thickness decreases.

FIG. 2a shows a square sheet 10; FIG. 2b shows the corresponding cut sheet after initial cutting, while FIG. 2c shows additional cutting lines 9 in order to form the final shape as well as the direction of rolling in order to obtain a truncated cone from the cut sheet. In this embodiment minor parts of the sheet 10 are discarded resulting from cutting lines 9. The fibers are preferably substantially oriented along the longitudinal extension of the cone, and the longitudinal edges 8 of the cut sheet are folded towards each other, and optionally attached to each other in order to maintain the cone shape. The sheets 10 may be of any desired shape and can optionally be cut into a desired shape in any manufacturing step before the sheets 10 are rolled into cones. The embodiment shown in FIGS. 2a-c is advantageous, when using veneers, in that the longitudinal axis of the cone will not completely correspond to the fiber direction of the veneer, in that the fibers are angled relative the longitudinal axis of the cone, whereby a cross-lamination of multiple cones is possible each of which may be configured with different fiber angles relative the nearest cone in the assembly. A cone is a very simple shape which can be made from almost any flat surface, depending on how it is folded. This has the benefit that sheets 10 of sizes and shapes that are easy to produce or transport can be used, as well as waste products from other types of manufacturing.

As one example, a cone may be much shorter than the final cone assembly. The shorter cone may be provided in order to form a connecting structure, or to reinforce existing connection structures. The shorter cone may e.g. be made of wood or metal, and may even have an overlapping configuration of the longitudinal edges. Such overlap may be in the range of 5-10 mm, or more.

The longitudinal edges 8 of the sheets 10 may be straight or curved. They may e.g. be sine-shaped, or saw tooth-shaped in order to improve alignment of the edges to each other. The width of the sheets may be different.

Now turning to FIG. 2d another example is shown. Here, a roll 11 of a sheet-like material is provided, and cut into separate sheets 10 in a continuous manner. Preferably the roll 11 is oriented such that the sheet-like material has its fiber direction in the cross-wise direction. As a result of the cutting process, a series of sheets 10 is thereby provided. The sheets 10 could be made with the same size, thereby forming identical cones. However, in a preferred embodiment the sheets 10 have a varying size, such that one sheet 10a will be used to form an outer cone C2, one sheet 10b will be slightly smaller to form an intermediate cone C3 to fit inside the outer cone C2, and one sheet 10c will be slightly smaller than sheet 10b in order to form an inner cone C1 to fit inside the intermediate cone C3. Practically, this is accomplished by using constant cutting angle and length for each cone, but decreasing the width for consecutive sheets (used to later form consecutive cones).

After the sheets 10 are formed, they can be stacked on top of each other and arranged in a glue application station. Here, rolls GA are arranged in contact with the longitudinal ends of the sheets. As the rolls GA are provided with an adhesive, such as glue, the adhesive will be transferred to the ends of the sheets as the rolls GA are moving along the longitudinal ends of the sheets 10.

Each sheet 10 is then introduced in a female mold 60, as is shown in FIG. 2f. As the sheet 10 is inserted, the sheet 10 will fold automatically such that the longitudinal edges of the sheet meet. By having glue, or other adhesive, on the longitudinal ends of the sheet 10 this will eventually harden thereby fixating the cone-shape. Once withdrawn from the mold 60, the sheet 10 is now in the shape of a cone C1, C2.

Adhesive, and optionally also heat and/or pressure, may therefore be used to connect the longitudinal edges of the sheet. The adhesive may be wet or dry, and pressure and/or heat may be applied in various ways. Examples of suitable adhesives include thermo set glues, such as urea formaldehyde, melamine formaldehyde, phenol formaldehyde based or thermo plastic glues such as PVA-c, melt glues.

Once a number of cones C1, C2 is produced, these cones are used to form a cone assembly. For this, a mold 60 is again used. The mold 60 used to form the cone assembly may be the same mold as used for producing individual cones, or it may be another mold. In particular, if the cone assembly is to have another shape than the individual cones, another mold will be required.

The cones are inserted in a consecutive manner; an inner cone C1 is inserted into an intermediate mold C3 which in turn is inserted into an outer cone C2. Adhesive may be used to attach the cones C1-C3 to each other, and a male tool may be further used to press the cones C1-C3 to the desired shape. The cones are preferable rotated relative each other, at least 5 degrees or more, such that the longitudinal seam/joint of one outer cone is positioned off set relative a longitudinal seam/joint of an inner cone. A wood cone and an inner paper cone may have the seams/joints aligned, while a third inner cone has its seam/joint off set in relation to said first seams. The seams may have different angles relative the longitudinal axis of the cone assembly such the seams cross each other.

The molds 60 may be formed in two or more pieces, such that they can be separated. This facilitates withdrawal of the cones C1-C3, as well as the cone assembly, from the mold 60.

As can be seen in FIG. 2g, the cones C1-C3 are rotated relative each other in order to ensure that the joints, i.e. the connection of the longitudinal edges of the sheets, are separated in the circumferential direction.

When arranging the plurality of cones C1, C2 in a linear array, such that an inner cone C1 is received by at least one outer cone C2, the inner surface of the outer cone C2 is substantially covering the entire outer surface of the inner cone C1.

Figure 3:
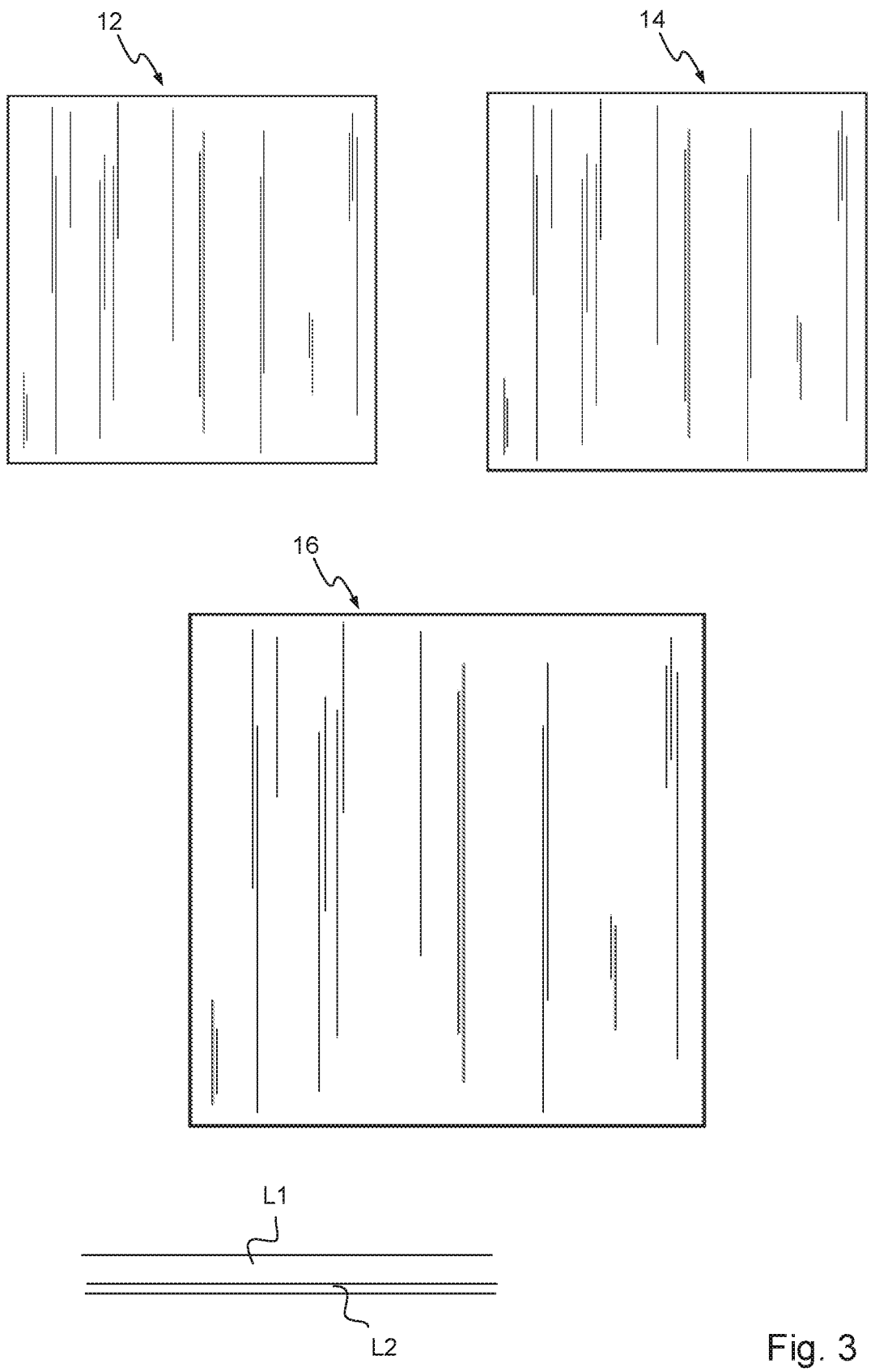
FIG. 3 shows three sheets with different combinations of backing and coating.

FIG. 3 shows sheets 12, 14, 16 that have been provided with different materials and coating. The sheets are shown as a first sheet 12 with a backing material 12 but no coating, a sheet 14 with a coating but no backing material, and a sheet 16 with a combination of both a backing material and a coating. There may be other types and combinations of backings and coatings for the sheets 12, 14, 16, such as adding an adhesive coating, and the backings and coatings may be provided before or after the sheets 12, 14, 16 have been cut or rolled into cones. Different sheets 12, 14, 16 and cones can have different backings and coatings in the same linear cone array and the same sheet can have several backings or coatings that are applied in different manufacturing steps, both before and after the sheet has been rolled into a cone. This freedom of choice of not only what materials, backings and coatings to use, but also when to apply them allows for a flexible production system, where certain process steps may be outsourced to a third party or produced at a different factory.

FIG. 3, at its bottom part, also shows a cross-sectional view of a sheet used to form a cone. The sheet 10 has a first layer L1 arranged adjacent to a second layer L2. In an embodiment, the first layer L1 is a wood veneer, while the second layer L2 is a backing material. It should be readily understood that in some embodiments the second layer L2 is omitted, while the materials of the first and second layers L1, L2 can be chosen depending on the particular application.

In an embodiment, the sheet may consist of several strips on the outer surface such that it forms a visual striped design. Yet further, the sheet may be stained and/or varnished, but thanks to being flat it may also be embossed and/or brushed and then efficiently varnished e.g. with acrylic lacquer. The embossing may be formed by pressing an embossed roll or plate against the veneer, said embossing means being preferably heated, preferably between 60-200 degree C. and preferably with the presence of resins on the back side or inside the veneer by being resin impregnated. The embossing may meet and match each other along the longitudinal edges such that the seam, or joint, is even more hidden. With match is meant that at least 30%, more desirably at least 50%, of protrusions and indentions on the veneer surface on one side of the edge will substantially correspond in height to protrusions and indentions of the abutting longitudinal edge of the veneer.

Figure 4:
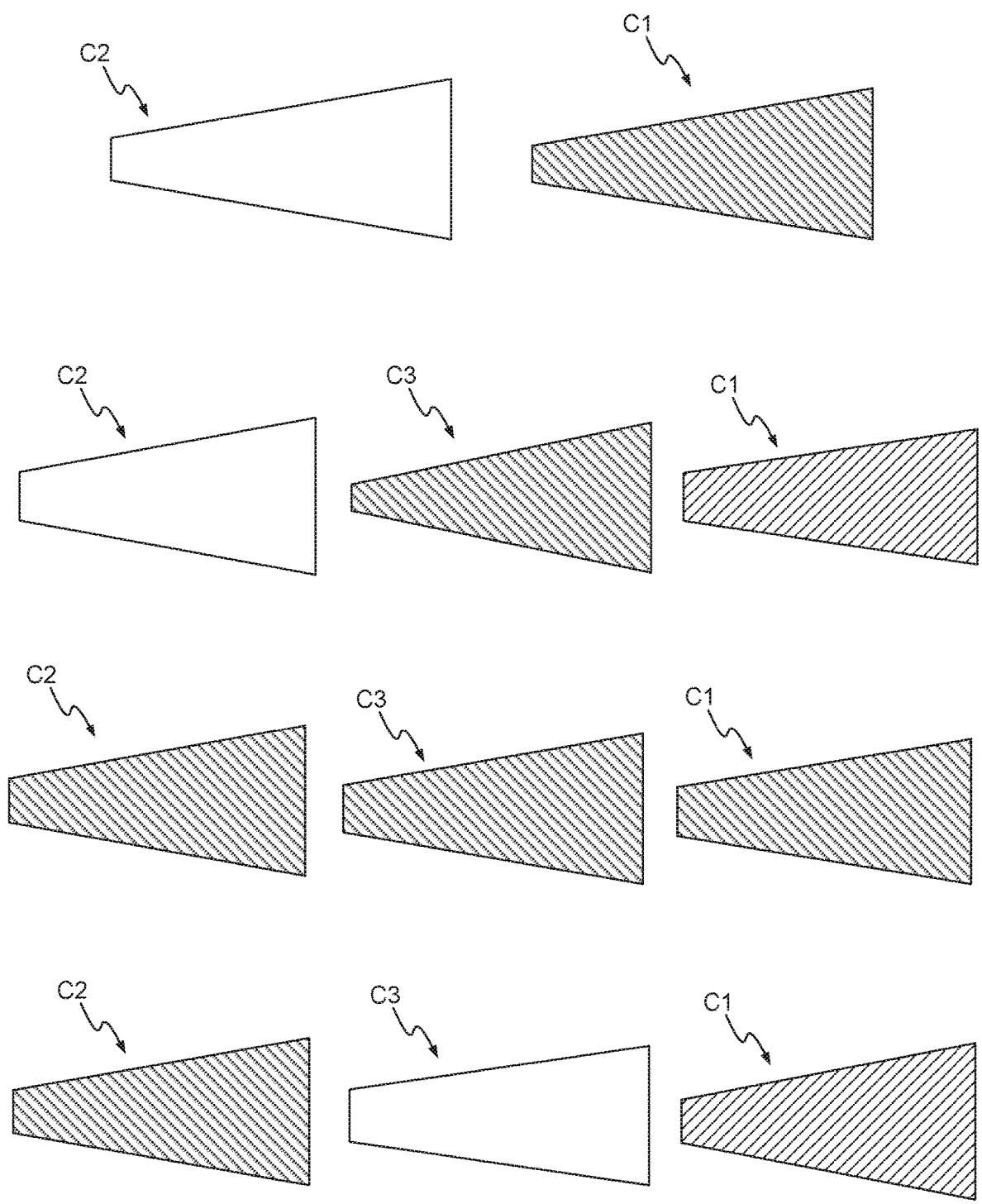
FIG. 4 shows different arrangements of cones in linear arrays of cones.

With reference to FIG. 4 different non-limiting combinations of backings, coatings and materials will now be discussed. Any number of cones can be combined within the scope of the technical concept described herein, as long as there are at least two cones, and at least the outermost cone C2 is made from a first layer L1 of material. The first layer L1 of material is preferably different from the material of the inner cone. In a preferred embodiment, at least one of the cones C1-C3 is provided with a backing material. The inner cone C1 may be made of a solid material, such as for example softwood or hardwood or glulam wood, i.e. forming a solid cone. The outermost cone may be made of a paper or non woven backing reinforced wood veneer folded to a cone and being glued along the longitudinal edge, provided with glue on the inner envelope surface. The inner cone may have a elliptical or polygonal cross section shape that may vary along the longitudinal elongation of the cone assembly.

According to one example, the outer cone C2 is made of an A-grade wood veneer backed by kraft paper having gsm of 80-150, the intermediate cone C3 is made of low value wood veneer such as spruce or pine, backed by kraft paper, while the inner cone C1 is made of a low grade veneer, backed by kraft paper. The resulting cone assembly may be provided with end plug/s and/or one or more middle plugs. The middle plugs are preferably provided with a hole and they are tapered inwardly towards the hole.

At the top of FIG. 4 an outer cone C2, e.g. made of a wood veneer without backing material, is receiving an inner cone C1 of non-wood veneer material (such as paper, plastic, hemp, cellulose, laminate or medium density fibreboard (MDF) or equivalent material) with backing being applied only to the inner cone C1. Below this array, the same combination is shown with an additional non-veneer material intermediate cone C3 without backing is inserted into the above array.

Below this array, a combination of three veneer cones C1-C3, all provided with backing is shown. At the bottom, an array is shown with two non-veneer cones C1, C3 without backing being inserted into a veneer cone C2 with backing. The benefit of being able to somewhat freely combine materials, backings and coatings as well as the amount of cones allow for a cone assembly that can have different supporting properties, price, size and manufacturing speed without having to change the production system substantially.

For the embodiments in which the outermost cone C2 is made from veneer or equivalent material, the resulting cone assembly will have a classically aesthetically pleasing exterior and by demanding that at least one cone C1-C3 is provided with a backing material, the stability of the cone assembly is further enhanced. These properties makes the cone assembly particularly suitable for use a furniture leg. Further combinations, different backings and coatings, new combinations of backings and coatings as well as more than three cones in one array are also possible.

Figure 5:
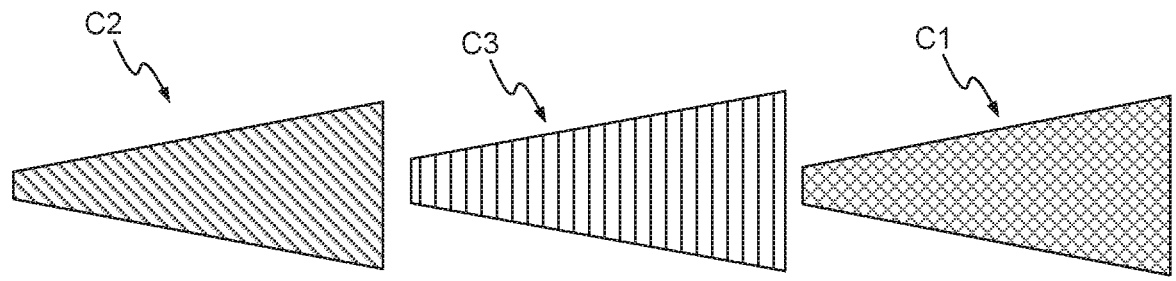
FIG. 5 shows coated and adhesive cones in linear arrays of cones.
Figure 5:
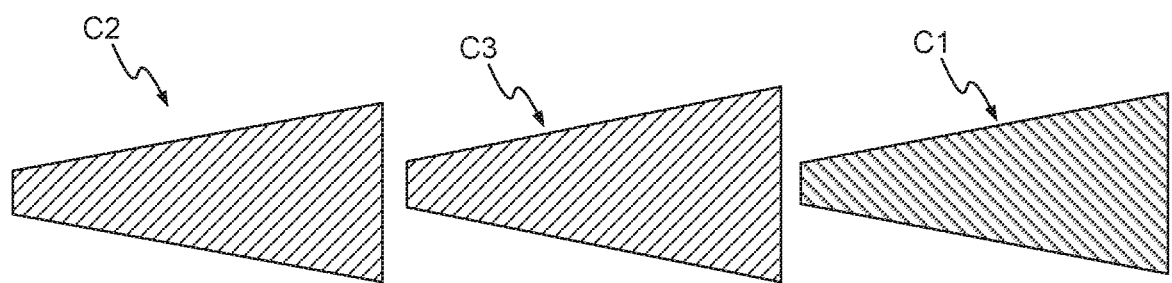

Reference is now made to FIG. 5, which illustrates further non-limiting combinations of backings, coatings and materials within the scope of this invention. The top array of cones shows a cone C2 made of a veneer or equivalent non-veneer material with backing, into which one or more intermediate cones C3 of a non-veneer material (such as paper, plastic, hemp, cellulose, laminate or medium density fibreboard (MDF) or equivalent material) being provided with an adhesive is inserted. Further inserted into the array is an inner veneer cone C1 provided with an adhesive. The bottom array of cones shows an outer veneer cone C2 being provided with a coating. The array further consists of one or more intermediate non-veneer cones C3 being provided with a coating and an inner veneer cone C1 with a backing material. Applying an adhesive to the cones C1, C3 in the array has the benefit of maintaining the structural integrity of the array, making sure that the array cannot be pulled apart or that the cones can be separated. Depending on the adhesive used, it can also provide further benefits. By using an adhesive that is malleable when first applied and rigid when dry, it can help maintain the shape of an array that has been pressed to a new shape before the adhesive has dried. Examples of such adhesives are glue, heat treated or molten plastic and other types of curable resins.

The benefits of applying a coating depends on the coating used. Certain oils or chemicals can be used to help the cone assembly withstand environmental conditions, further increasing the longevity of the product. The benefit can also be aesthetic, by using coatings such as wood stains or paint. In this case, it may be beneficial to only coat the outermost cone.

The adhesive may be applied to the sheets prior to cone forming. The adhesive may be selected as a type of adhesive being dry in normal state and activated by heat and/or pressure.

For the examples above, it should be mentioned that the inner cone C1 may not necessarily be manufactured by folding the sheet, as described. Instead, the inner cone C1 may be a solid cone onto which intermediate and outer cones C2, C3 are arranged.

Figure 6A:
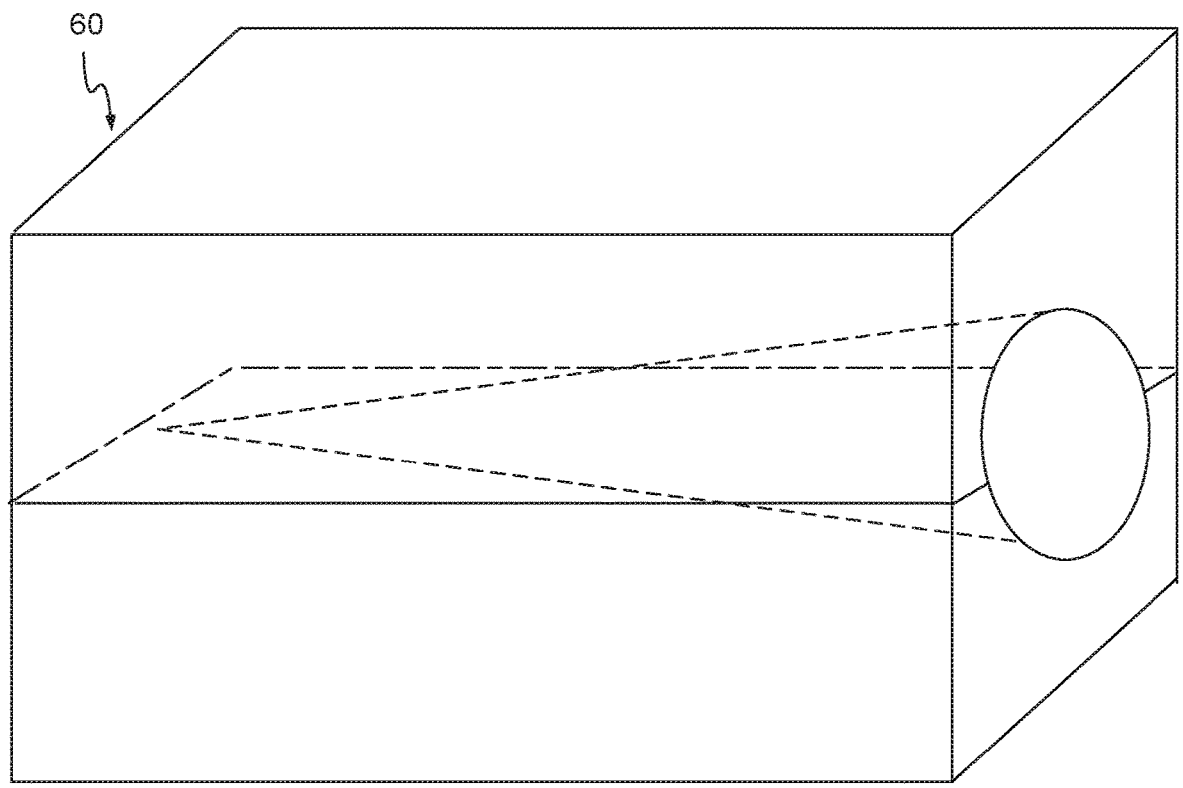
FIG. 6a shows a mold for forming the sheets into cones.
Figure 6B:
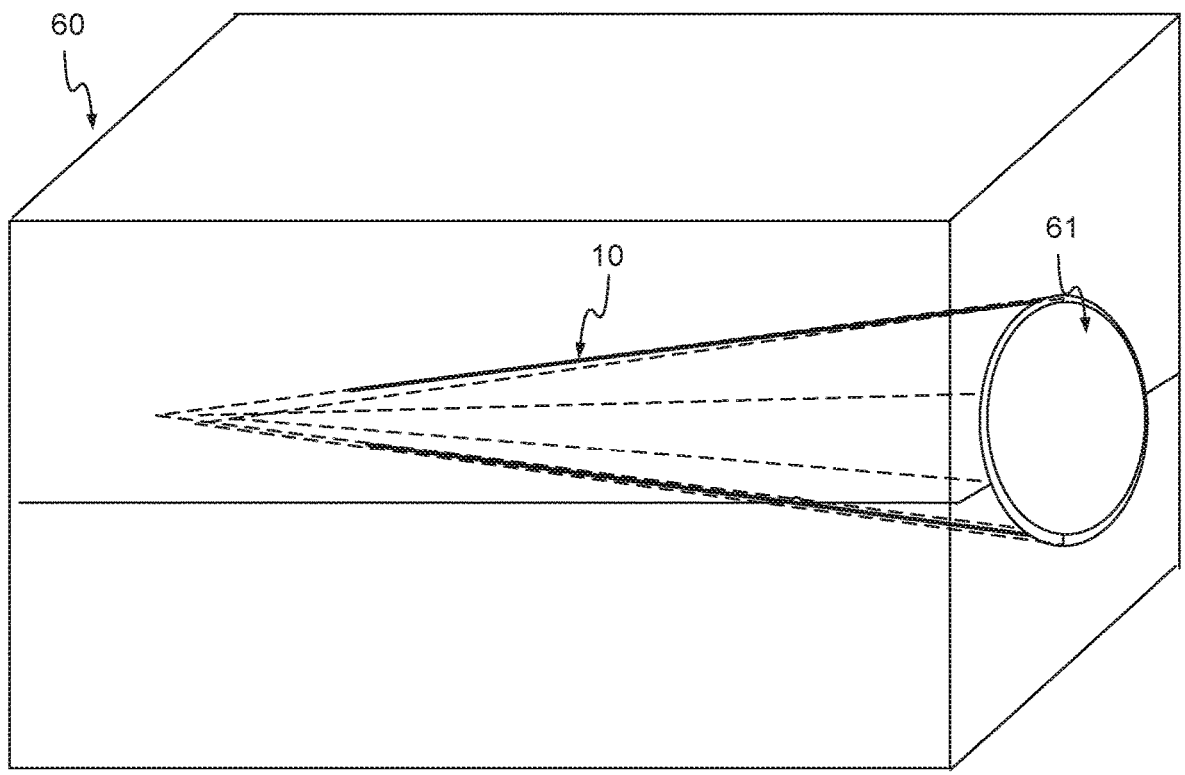
FIG. 6b shows a mold with a sheet in it, as well as an optional male tool

The embodiment of FIGS. 6a and b shows a mold 60 for receiving and forming the sheets 10 into individual cones. The mold 60 can be of any shape or size and can have several different shapes available in one mold. The mold 60 may preferably be constructed so that the longitudinal edges 8 of the sheet 10 will meet when the sheet is inserted in the mold, allowing for a quick and easy process of attaching the edges 8 of the sheet 10 to each other. The benefits of using a mold 60 are that the shape and size of the cones are more easily made congruent, the shape and size of the sheet 10 can be inconsistent while still maintaining the same shape and size of the cones, the edges are easier to attach to each other and the mold may be used to apply coatings more easily. Optionally, the sheet will be pressed to conform to the shape of the female mold by means of a male tool 61, as illustrated in FIG. 6b. As the male tool 61 is inserted into the female mold 60, the cone will be shaped.

As explained earlier, the same mold concept can be used to form the cone shaped member. Instead of inserting a sheet of material, a series of cones C1-C3 are inserted. If the inner cone C1 is hollow, a male tool may be used.

Figure 7A:
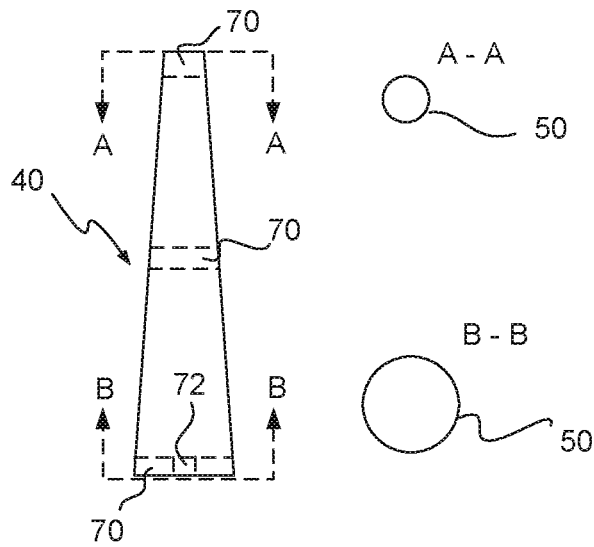
FIG. 7a shows views of a finished cone assembly.
Figure 7B:
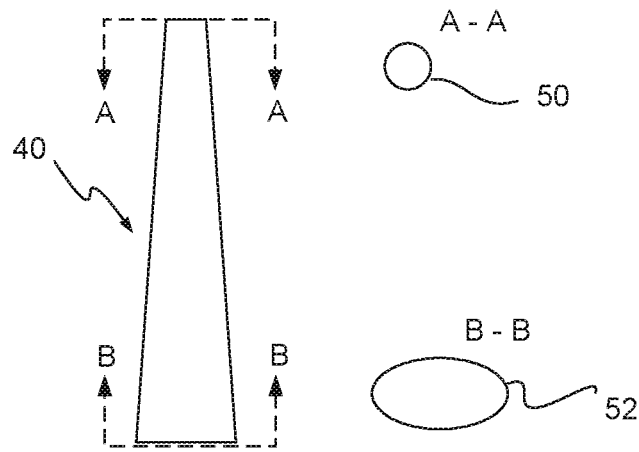
FIGS. 7b and 7c show views of finished cone assemblies with different shapes.
Figure 7C:
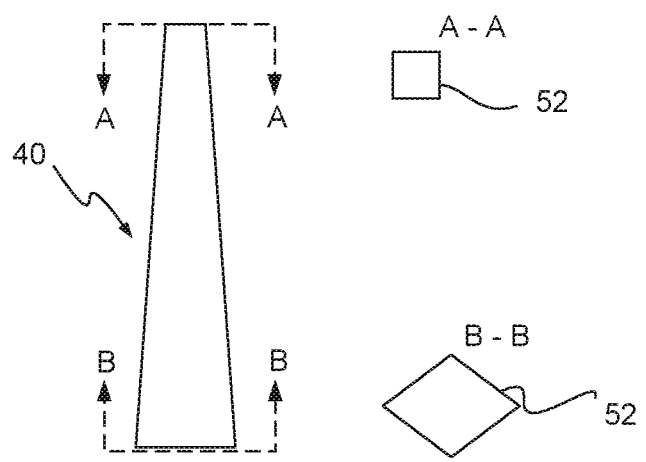

FIG. 7a shows a first embodiment of a cone assembly, while FIGS. 7b-c show more embodiments of a cone assembly. In FIG. 7a a linear array of cones 40 is shown, formed by a plurality of cones. The cone assembly 40 is provided with a circular cross-section 50 along the entire length of the linear array 40 of cones. Further, the array 40 has been cut, or the cones forming the array have been sized so that there are no protruding cones extending from the ends of the array. This may be beneficial due to a flat end being easier to fasten to a piece of furniture. It also increases the stability of the cone assembly if all of the cones reach the ends of the array. The circular cross-section is easy to manufacture and transport and also has a predictable response when shaped.

In FIG. 7a, three examples of support members 70 are schematically shown, each support member can be used alone or in combination with one or more support members. These could of course also be used with the cone assemblies of FIGS. 7b-c. One support member 70 is at the upper end, one support member 70 is at the bottom end, while one support member 70 is arranged in between the upper and bottom end. On or more of the support members 70 could be provided with a through hole 72.

FIG. 7b shows another version of a cone assembly. The linear array of cones 40 is formed in a similar manner as in FIG. 7a, except in this embodiment, the array of cones 40 has been pressed to change at least one of the circular cross-sections 50 at both ends of the array to another, possibly more desired shape 52. By using appropriate materials, backing and coating as well as possibly further manufacturing steps, this new shape 52 can be maintained if desired. The new shape may be desired because of aesthetic reasons, functional reasons or other reasons. Beyond changing the cross-section of the cones of the array, bending the array is also considered to be within the definition of pressing the array. In such case the mold may consist of two or more parts that are possible to separate from each other and the mold itself may consist of flexible material, yet exhibiting high shore D hardness properties, preferably between 20-80, even more preferably 40-60. It may consist of silicone, synthetic or natural rubber and the like. The benefit of being able to change the shape of the cone assembly is that mostly the same production system may be used for different aesthetic and functional demands.

In FIG. 7b the bottom end has an elliptic shape 52. FIG. 7c shows another version of the cone assembly. In this figure, the upper end of the cone assembly 40 is provided with a square cross-section 52, while the bottom end is provided with a parallelogram, such as a rhombus, shape.

Manufacturing the cone array is preferably performed by inserting a first cone into a female mold having the shape of the desired cone assembly, and thereafter feeding additional cones into the first cone. A male tool may optionally be used to further press the cones into the desired shape. The female cone may consist of two or several halves that may be opened. The mold may also consist of two for more halves that may be inserted and pulled of collectively or individually.

Figure 8:
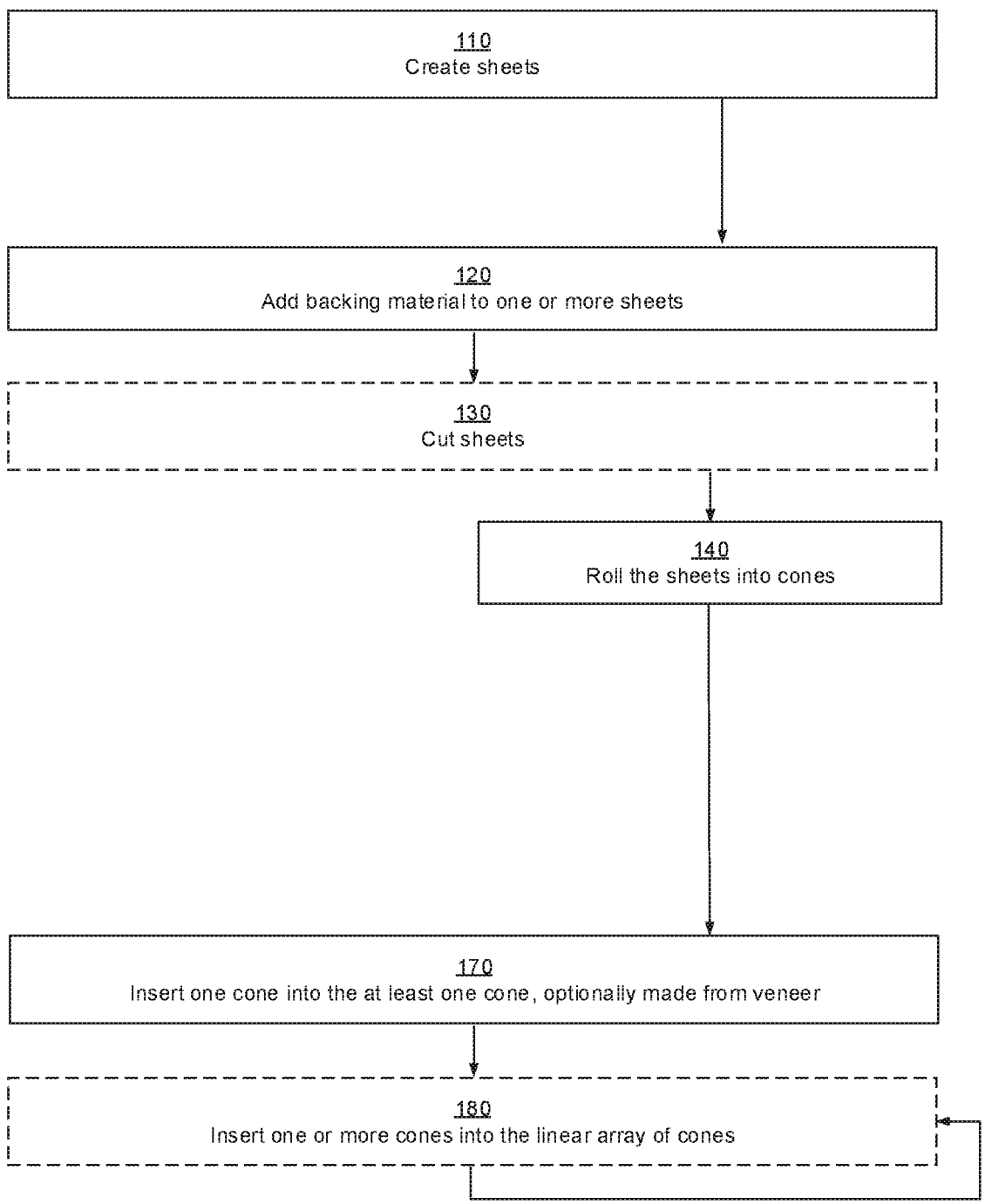
FIG. 8 shows a flowchart with steps of manufacturing the cone assembly.

Reference is now made to a method of manufacturing according to FIG. 8. First, the sheets are created 110. There are many ways to create sheets suitable for rolling into cones of which the skilled person is aware, the creation may not necessarily even be intended as in a previously presented embodiment waste products were to be used as sheets. Either during the creation process or afterwards, backing material may be added to one or more of the sheets 120. The backing material may be many different materials and also a combination of materials, the importance of the backing material is that it increases the sturdiness of the cone once the sheet has been rolled into a cone, as well as it makes sure the sheet is remained intact during cone forming. After the backing material is added, the sheets may need to be cut 130. This may be done to better fit the cones together or to possibly fit the sheets to a mold, however it is an optional step. The next step is individually rolling 140 the sheets into cones. This can be done is a variety of different ways and it may be preferable to attach the longitudinal edges of the sheets during this step. Once the cones are created, one cone is inserted 170 into another cone. The veneer cone in this step will be the outermost cone in the finished array. After the first cone has been inserted into the outermost cone, any amount of further cones may optionally be inserted into the array by repeating step 180. This text makes no difference between inserting cone A into cone B and cone B receiving cone A. The skilled person will realise that the steps do not necessarily have to happen in the order described and some steps may also be combined with other steps.

Figure 9:
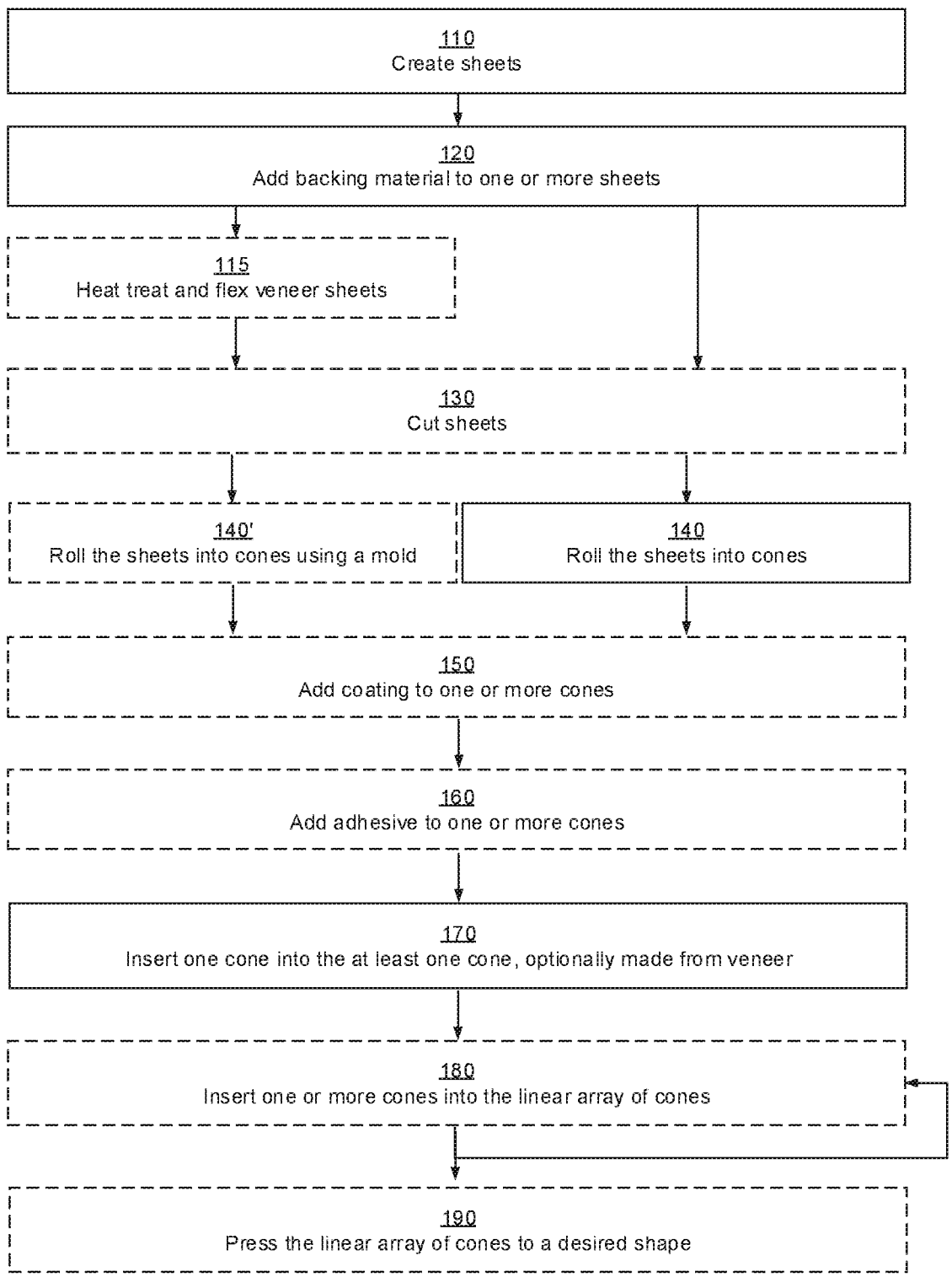
FIG. 9 shows an alternative flowchart with steps of manufacturing the cone assembly.

An alternative embodiment is shown in FIG. 9. First, the sheets are created 110. The veneer sheets are then heat treated and tenderized 115. The phrase tenderizing is to be interpreted as a process of controllably breaking or crushing the fibres of the veneer to make it more flexible, as for example achieved by machines available by HOFER Presstechnik GmbH. The heat treatment can happen before, after or during the tenderizing. Most preferably, the heat treatment is performed in connection with inserting the wood veneer into the mold in order to soften the material. Suitable temperature ranges include 50-180° C., depending on the materials used. The heat treatment is a preferred to improve the result of the flexing process. The benefit of flexing the veneer sheets is that they will be more flexible, allowing smaller cones to be able to be rolled from them. After, before or during the flexing, backing material is added 120 to the sheets and the sheets are optionally cut 130. Next, the sheets are rolled into cones 140. One embodiment of this method uses a mold to roll the sheets 140'. The benefits of using a mold are that the shape and size of the cones are more easily made congruent, the shape and size of the sheet 10 can be inconsistent while still maintaining the same shape and size of the cones, the edges are easier to attach to each other and the mold may be used to apply coatings 150 more easily. As is understood, preferably the sheet is cut to fit exactly within the mold such that the longitudinal edges of the sheet meet, but do not overlap. Before, after or during the previous step, the steps of adding coatings 150 and adhesives 160 may be performed. Applying an adhesive to the cones in the array has the benefit of maintaining the structural integrity of the array, making sure that the array cannot be pulled apart. Depending on the adhesive used, it can also provide further benefits. By using an adhesive that is malleable when first applied and rigid when dry, it can help maintain the shape of an array that has been pressed to a new shape before the adhesive has dried. Examples of such adhesives are glue, heat treated or molten plastic and curable resins. The benefits of applying a coating depends on the coating used. Certain oils or chemicals can be used to help the cone assembly withstand environmental conditions, further increasing the longevity of the product. The benefit can also be aesthetic, by using coatings such as wood stains or paint. In this case, it may be beneficial to only coat the outermost cone. Next, a cone is inserted into a cone 170, forming the linear array of cones. Optionally, additional cones can be inserted 180. Finally, one embodiment presses the finished linear array of cones to a desired shape 190. The pressing may comprise bending by hand or by machine, pinching by hand or machine and molding by hand or machine. The shape created by the pressing may be permanent or not and in the case of permanent may use cone materials, backings, coatings or adhesives to maintain the shape after pressing.

In the following, some examples of cone assemblies will be described.

Example 1: A normal size furniture leg, typically for use with a kids chair, or sofa table.

Number of cones: 4

Outer cone: made from a sheet of wooden veneer being provided with a backing material (non-woven material or cardboard), or from a finished foil; i.e. a sheet of high-alpha cellulose, impregnated with blend of aminoplast and thermoplast resins (acrylic resin) and where applicable varnished. The outer cone is rigidly formed to a circular cross-section by attaching the longitudinal ends of the sheet material to each other, and fixating the joint e.g. by means of an adhesive being applied along the entire length of the longitudinal ends. The joint formed by means of the longitudinal ends meeting each other is flush with the circumferential surface of the cone, thereby providing a continuous and smooth exterior surface of the outer cone.

Intermediate and inner cones: made from paper. The paper can be oriented such that the manufacturing direction of the fibers of the paper is parallel with the longitudinal axis of the cone. In such manner folding of the paper will be facilitated. For increasing robustness of the cone, the manufacturing direction of the fibers of the paper is instead perpendicular to the longitudinal axis of the cone.

Sheet thicknesses: Wooden veneer: 0.3-0.6 mm, paper: 0.3-0.45 mm, foil: 0.2 mm.

Leg length: 150-200 mm.

Cone circumference, upper end: 100-200 mm.

Cone circumference, bottom end: 50-100 mm.

Total thickness of cone assembly: 2-3 mm.
Coating: UV, water based.
Adhesive: Melamin.

Example 2: A large size furniture leg, typically for use with a chair, table, or lamp holder/rod.

Number of cones: 4

Outer cone: made from a sheet of wooden veneer being provided with a backing material (non-woven material or cardboard), or from a finished foil; i.e. a sheet of high-alpha cellulose, impregnated with blend of amino plast and thermo plast resins (acrylic resin) and where applicable varnished. The outer cone is rigidly formed to a circular cross-section by attaching the longitudinal ends of the sheet material to each other, and fixating the joint.

Intermediate and inner cones: made from paper. The paper can be oriented such that the manufacturing direction of the fibers of the paper is parallel with the longitudinal axis of the cone. In such manner folding of the paper will be facilitated. For increasing robustness of the cone, the manufacturing direction of the fibers of the paper is instead perpendicular to the longitudinal axis of the cone.

Sheet thicknesses: Wooden veneer: 0.3-0.6 mm, paper: 0.3-0.45 mm, foil: 0.2 mm.
Leg length: 500-1000 mm.
Cone circumference, upper end: 100-200 mm.
Cone circumference, bottom end: 30-100 mm.
Total thickness of cone assembly: 2-3 mm.
Coating: UV, water based.
Adhesive: Melamin.

Example 3: A large size furniture leg, typically for use with a chair, table, or lamp holder/rod.

Number of cones: 4

Outer cone: made from a sheet of A-grade wooden veneer being provided with a backing material (non-woven material or cardboard). The outer cone is rigidly formed to a circular cross-section by attaching the longitudinal ends of the sheet material to each other, and fixating the joint.

Intermediate and inner cone: made from a sheet of B-grade wooden veneer being provided with a backing material (non-woven material or cardboard). The intermediate and inner cones are rigidly formed to a circular cross-section by attaching the longitudinal ends of the respective sheet material to each other, and fixating the joint.

Sheet thicknesses: Wooden veneer: 0.3-0.6 mm, paper: 0.3-0.45 mm, foil: 0.2 mm.
Leg length: 500-1000 mm.
Cone circumference, upper end: 100-200 mm.
Cone circumference, bottom end: 30-100 mm.
Total thickness of cone assembly: 2-3 mm.
Coating: UV, water based.
Adhesive: Melamin.

Example 4: A waste basket.
Number of cones: 7-9

Outer cone: made from a sheet of A-grade wooden veneer being provided with a backing material (non-woven material or cardboard). Optionally, the outer cone is made from a finished foil. The outer cone is rigidly formed to a circular cross-section by attaching the longitudinal ends of the sheet material to each other, and fixating the joint.

Intermediate and inner cone: made from a sheet of B-grade wooden veneer being provided with a backing material (non-woven material or cardboard). Alternatively, MDF is used for forming the intermediate and inner cones. The inner cone can be made from a sheet of material with no backing material. Optionally, the sheets are reinforced at their ends. The intermediate and inner cones are preferably rigidly formed to a circular cross-section by attaching the longitudinal ends of the respective sheet material to each other, and fixating the joint.

Sheet thicknesses: 0.6-1.0 mm.
Basket height: 400-500 mm.
Cone circumference, upper end: 1000 mm.
Cone circumference, bottom end: 800 mm.
Total thickness of cone assembly: 7-9 mm.
Coating: UV, water based, or wax oil.
Adhesive: Melamin.

Example 5: A stool.
Number of cones: 7-9

Outer cone: made from a sheet of A-grade wooden veneer optionally being provided with a backing material (non-woven material or cardboard). Optionally, the outer cone is made from a finished foil. The outer cone is preferably rigidly formed to a circular cross-section by attaching the longitudinal ends of the sheet material to each other, and fixating the joint.

Intermediate and inner cone: made from a sheet of B-grade wooden veneer optionally being provided with a backing material (non-woven material or cardboard). Alternatively, MDF is used for forming the intermediate and inner cones. Optionally, the sheets are reinforced at their ends. The intermediate and inner cones are preferably rigidly formed to a circular cross-section by attaching the longitudinal ends of the respective sheet material to each other, and fixating the joint.

Sheet thicknesses: 0.6-1.0 mm.
Basket height: 400-600 mm.
Cone circumference, upper end: 1200 mm.
Cone circumference, bottom end: 1000 mm.
Total thickness of cone assembly: 7-9 mm.
Coating: UV, water based, or wax oil.
Adhesive: Melamin.

In the following, some technical considerations will be described which can be combined in any possible combination to form embodiments of the present invention. Especially, these embodiments may also be combined with the specific embodiments described herein in the foregoing.

The sheets of material, used to form the cones, may be processed by attaching the longitudinal ends to each other, e.g. by means of glue, tape, sewing, backing material overlap, etc. Such processing may be performed in-line, or in a separate machine. Each cone can then be a flattened piece of connected sheet, which transforms into a cone when erected.

The longitudinal ends may in other embodiments not be connected using glue or other connecting means during separate cone forming, but the ends may instead be joined by glue entering the area of the longitudinal joint when cones are connected to form the cone assembly.

In case of wooden veneer, the veneer can be provided with a backing material such as paper, non-woven material, lacquer, etc. The wooden veneer and the backing material may have different fiber directions.

For wooden veneers, the fiber direction should preferably be aligned with the longitudinal direction of the cone to be formed. In case of a lathed veneer, the exterior side of the veneer should preferably be the exterior side of the entire cone assembly. The backing material could have a fiber direction being cross-wise the fiber direction of the wooden veneer, such as more than 20°, or even more than 45° of an amount of fibers exceeding 30%.

Tenderizing is preferably performed on wooden veneers having a backing material. Especially for veneers having a thickness above 1 mm, and for cones having a radius of less than 100 mm.

Before forming a sheet of material into a cone, the sheet may be heated in order to soften the veneer and to facilitate cone forming. This may also be performed for separate cones during cone assembly production.

When forming the cone assembly, a male tool may be used to press the cones radially outwards. The male tool can be split, which facilitates withdrawal of the male tool especially at planar surfaces of the cones and/or cone assembly. The female mold may also be split, for the same purpose.

The glue for connecting two cones to each other during forming of the cone assembly can be dry, and applied to the exterior side of the inner cone. This is particularly advantageous if the male tool is heated.

One example of a cone assembly if formed by an outer cone, formed by a wooden veneer having a backing material, and an inner solid cone. The solid cone can be of the same material as the wooden veneer, or it can be formed as end plugs of the same material.

The inner cone may be formed as a partially solid core, e.g. a bottom end plug, a center plug for establishing a connection means at the center of the furniture legs, or as an upper plug.

Should the individual sheets be connected into planar (and folded) cones there is a reduced need to produce separate cones, as these instead are produced as taped sheets.

The interior of the cone assembly can be filled with a suitable material, such as sand, iron powder, or other material in order to provide the same weight as if the cone assembly was made of solid wood. The interior of the cone may be partially filled in order to adjust (and lower) the center of mass of the cone assembly.

When producing the cone assembly, the separate cones can be heated. The interior surface, the exterior surface, or both the interior and the exterior surface can be heated. The glue can be applied to the interior surface, the exterior surface, or both.

Heating of the cones may be performed by arranging all cones in a cone assembly, and heat the entire cone assembly using the female mold and the male tool.

The longitudinal ends of a sheet of material can be joined using glue, a heating block on one side of the sheet of material, and a roller on an opposite side of the sheet of material. By rolling along the longitudinal ends, the joint is formed.

For applying the glue to the exterior surface of a cone the cone may be mounted on a male tool, which his rotated as the glue is applied, e.g. by spraying.

Two sheets of material may be reinforced by at least one inner sheet, where such inner sheet has either no fiber orientation or if fiber orientation, the majority of such fibers will be fastened at an angle relative the orientation of the reinforced joint.

The outer veneer may be milled away partially, in the radial direction, such that an inner veneer becomes the exterior surface, e.g. striped, or conical by lathing after cones are fixed to each other.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A cone assembly for furniture or interior accessories, comprising:
    a plurality of cones arranged in a linear array to form the cone assembly, wherein an inner cone is received by at least one outer cone; and
    wherein the at least one outer cone is made of a first layer of material and a backing material, the first layer of material being different from a material of the inner cone,
    wherein the backing material is different from the material of the first layer, the backing material being a paper-based backing material or a non-woven backing material.

2. The cone assembly according to claim 1, wherein a length of the at least one outer cone and a length of the inner cone are both substantially equal to a length of the cone assembly.

3. The cone assembly according to claim 1, wherein at least the at least one outer cone is formed by attaching longitudinal edges of the first layer of material to each other.

4. The cone assembly according to claim 1, wherein the inner cone has a uniform thickness at each specific longitudinal position.

5. The cone assembly according to claim 1, further comprising at least one intermediate cone arranged between the inner cone and the at least one outer cone.

6. The cone assembly according to claim 5, wherein at least one of the intermediate cones is made of a material being the same, or different from the material of the inner cone.

7. The cone assembly according to claim 1, wherein the first layer of material comprises one or more of the following materials: wood veneer, cork, paper, hemp, cellulose, laminate, thermosetting resin impregnated paper, thermoplastic sheet, metal, or medium density fiberboard (MDF).

8. The cone assembly according to claim 3, wherein the longitudinal edges of the first layer of material are attached to each other by i) providing the edges with an adhesive prior to arranging the at least one outer cone in the linear array, ii) allowing adhesive to flow along the longitudinal edges as a result of an inner cone, having the adhesive applied on its outer surface, being arranged inside the at least one outer cone, and/or iii) allowing an adhesive surface coating to flow along the longitudinal edges as a result of the outer surface of the outer cone being covered by said surface coating.

9. The cone assembly according to claim 5, wherein the inner cone and/or any of the intermediate cones is formed by attaching longitudinal edges of a material to each other.

10. The cone assembly according to claim 9, wherein:
    the joint between the longitudinal edges of the at least one outer cone is spaced apart, in a circumferential direction, from the joint between the longitudinal edges of the inner cone and/or the joint between the longitudinal edges of at least one of the intermediate cones;

or
the joint between the longitudinal edges of a cone is straight;
or
the joint between the longitudinal edges of a cone is curved.

11. The cone assembly according to claim 1, wherein an innermost one of the cones is hollow.

12. The cone assembly according to claim 1, wherein the cones are attached to each other using an adhesive.

13. The cone assembly according to claim 1, wherein:
a first end of the cone assembly has a first cross-sectional shape;
a second end of the cone assembly has a second cross-sectional shape being different from the first cross-sectional shape; and
the first cross-sectional shape and/or the second cross-sectional shape is non-circular.

14. The cone assembly according to claim 1, wherein the cone assembly is provided with a longitudinal slit.

15. The cone assembly according to claim 1, wherein the first layer of material of the at least one outer cone has a fiber direction being different from a fiber direction of the material of the inner cone.

16. The cone assembly according to claim 1, wherein an innermost one of the cones is extends along only a part of an entire length of the at least one outer cone.

17. The cone assembly according to claim 1, wherein the at least one outer cone extends along only a part of an entire length of an innermost one of the cones.

18. The cone assembly according to claim 1, wherein an outward facing surface of the at least one outer cone is provided with a coating.

19. A cone assembly for furniture or interior accessories, comprising:
a plurality of cones arranged in a linear array to form the cone assembly, wherein an inner cone is received by at least one outer cone,
wherein the at least one outer cone is made of a first layer of material and a backing material, the first layer of material being different from a material of the inner cone, and
wherein an innermost one of the cones is solid.

20. A method of manufacturing a cone assembly for furniture or interior accessories, the method comprising the steps of:
providing a plurality of cones; and
arranging the plurality of cones in a linear array, whereby an inner cone is received by at least one outer cone, wherein an inner surface of the at least one outer cone is substantially covering an entire outer surface of the inner cone,
wherein the at least one outer cone is made of a first layer of material and a backing material, the first layer of material being different from a material of the inner cone,
wherein the backing material is different from the material of the first layer, the backing material being a paper-based backing material or a non-woven backing material.

* * * * *